(12) United States Patent
Costigan et al.

(10) Patent No.: US 9,301,140 B1
(45) Date of Patent: Mar. 29, 2016

(54) BEHAVIORAL AUTHENTICATION SYSTEM USING A SECURE ELEMENT, A BEHAVIOMETRIC SERVER AND CRYPTOGRAPHIC SERVERS TO AUTHENTICATE USERS

(71) Applicant: Behaviometrics AB, Lulea (SE)

(72) Inventors: Neil Costigan, Lulea (SE); Ingo Deutschmann, Merseburg (DE); Tony Libell, Lulea (SE); Johan Lindholm, Boden (SE)

(73) Assignee: Behaviometrics AB, Lulea (SE)

( * ) Notice: Subject to any disclaimer, the term of this patent is extended or adjusted under 35 U.S.C. 154(b) by 82 days.

(21) Appl. No.: 14/070,654

(22) Filed: Nov. 4, 2013

Related U.S. Application Data

(60) Provisional application No. 61/722,804, filed on Nov. 6, 2012.

(51) Int. Cl.
  *H04M 1/66* (2006.01)
  *H04W 12/06* (2009.01)
(52) U.S. Cl.
  CPC .................................... *H04W 12/06* (2013.01)
(58) Field of Classification Search
  CPC .. G06F 21/32; G06K 9/00187; G06K 9/3283; H04L 9/3226; H04L 9/3231; H04L 9/3242
  See application file for complete search history.

(56) References Cited

U.S. PATENT DOCUMENTS

| | | | |
|---|---|---|---|
| 8,443,443 B2 | 5/2013 | Nordstrom et al. | |
| 2002/0010857 A1* | 1/2002 | Karthik | G06F 21/32 713/168 |
| 2006/0239512 A1* | 10/2006 | Petrillo | G06F 21/31 382/115 |
| 2007/0061590 A1* | 3/2007 | Boye | G06F 21/305 713/186 |
| 2009/0025071 A1* | 1/2009 | Mumm et al. | 726/7 |
| 2010/0146622 A1* | 6/2010 | Nordstrom et al. | 726/23 |
| 2010/0199328 A1* | 8/2010 | Heins | G06Q 10/10 726/3 |
| 2010/0225443 A1* | 9/2010 | Bayram et al. | 340/5.83 |
| 2011/0099602 A1* | 4/2011 | Apparao | G06Q 10/06 726/1 |
| 2011/0126024 A1* | 5/2011 | Beatson et al. | 713/186 |
| 2011/0314512 A1* | 12/2011 | Sinha | H04W 12/12 726/1 |

* cited by examiner

*Primary Examiner* — Mahendra Patel
(74) *Attorney, Agent, or Firm* — Michael J. Feigin, Esq.; Feigin & Fridman (57) ABSTRACT

Embodiments of the disclosed technology are directed to methods and/or systems for using behavioral authentication for authenticating particular users of particular mobile devices. The methods and/or systems may employ a behavior monitor, a secure element, a behaviometric server and/or cryptographic servers to authenticate users. The behavior monitor may gather, interpret, decrypt and/or encrypt behavior information using a secure element and a behaviometric server. The behaviometric server may be used to compare recorded behavior data and compare them to stored profiles of users in order to generate authentication information based on the comparison.

19 Claims, 4 Drawing Sheets

BEHAVIORAL AUTHENTICATION SYSTEM USING A SECURE ELEMENT, A BEHAVIOMETRIC SERVER AND CRYPTOGRAPHIC SERVERS TO AUTHENTICATE USERS

FIELD OF THE DISCLOSED TECHNOLOGY

The disclosed technology relates generally to mobile device security, and, more particularly, to a system for authenticating mobile users based on behavior.

BACKGROUND OF THE DISCLOSED TECHNOLOGY

Mobile devices and tablet computers have no built-in security mechanisms for user authentication, beside a traditional PIN, which is seen as insecure in a world where increasingly more information is stored on mobile devices. As mobile devices become a favorite target of thieves, it is important to not only secure the device itself, but also the data on it and the data accessible by it, against unauthorized access.

A SIM card is the only trustworthy element included in every mobile device which is able to connect to a telephone network. But SIM cards miss the capability to really identify the user; they authenticate only something "you know" not "who you are." Users tend to use simple or easy-to-type Personal Identification Numbers ("PINs"), especially on mobile devices. Voice or face recognition are also not easy to achieve on mobile devices.

There are several patent applications and issued patents in the field which use biometric methods to identify users on mobile devices. In U.S. Patent Publication No. 2010/0225443, a system is described for user authentication using touch sensitive elements and/or using a signature of the user. In U.S. Patent Publication No. 2011/0126024, a method and system are described for combining a PIN and a biometric sample. In U.S. Pat. No. 8,443,443, a behaviometric system is described for authenticating users, based on keyboard, mouse and GUI actions.

The typical gathering of behaviometric data lacks the security of binding the behaviometric data to a mobile device, so that a user may use any mobile device to authenticate himself. The ultimate goal of authenticating users in security is: "Something you know," "something you have," and "something you are." For security reasons, it is sometimes favorable to restrict users to certain "approved" mobile devices. This is not possible with the above described solutions. Thus, needed in the art are more effective systems and methods for authenticating a user of a device using behaviorial information.

SUMMARY OF THE DISCLOSED TECHNOLOGY

Therefore, it is an object of the disclosed technology to authenticate users of mobile devices based on monitoring and gathering behavior of a user, and using the stored behaviometric information to determine security clearance during future uses of the phone.

In an embodiment of the disclosed technology, a method is used for authenticating a user of a mobile device through behavior monitoring. The method is carried out, not necessarily in the following order, by: a) storing behavioral input data from at least one user input component of the mobile device on a non-transitory storage medium housed within the mobile device; b) uploading a version of at least a portion of the stored behavioral input data via a network connection to a behaviometric server; c) triggering a security test based on a received user credential input; d) retrieving the behavioral data from the behaviometric server and the storage medium within the mobile device; and optionally e) determining if behavioral input data entered during a current session of use of the mobile device match prior usage thereof; and/or f) generating a response based on the comparison, wherein the response is an authentication or a rejection of privileged access sought by the user by way of the user credential input.

"Behavioral input data," for purposes of this specification, is defined as data observed and/or recorded during user interaction with the user input component(s) of the mobile device. Such data may include the manner in which the user holds and orients the mobile device. The data may further include electronic input observations such as keystroke patterns and style, usage of particular applications, and speech recognition.

A "behaviometric server," for purposes of this specification, is defined as a locally or remotely accessible server having a processor for executing instructions stored on a non-transitory storage medium. The behaviometric server is configured to analyze behavioral input data and compare it with a database of recognizable behavioral profiles associated with a plurality of known users for at least one mobile device. The behaviometric server may have a database associated therewith for storing user profile data, prior usage data, and/or behavioral data regarding a plurality of users and devices. The database stored on, and/or accessible by, the behaviometric server may be continuously updated, pursuant to incoming behavioral data. That is, users' habits and patterns of use with regard to a mobile device may change over time. Prior usage data and profile information, therefore, may be required to be continuously updated to reflect these changes, in order to make accurate future determinations.

A "user credential input," for purposes of this specification, is defined as any action desired to be taken on the mobile device that involves an exchange of sensitive information or currency. Sensitive information may be any information deemed to be considered secure or private to an individual. Such sensitive information may include social security numbers, addresses, passport information, banking information, credit card information, etc. The "user credential input" may also include access to credit card information, banking information, or other online payment information, for purposes of executing an exchange of currency, such as, for example, a purchase from an online merchant.

A "current session," for purposes of this specification, is defined as an interval of usage of the mobile device by a single user. The start of a session may be when the mobile device screen is turned on, when a lock screen is unlocked, or when the mobile device is used after a period of dormancy or inactivity. For example, if the phone is lying idle for five, ten, or twenty minutes (a "period of inactivity") and is suddenly moved (as determined by the accelerometer), then a new session may be deemed to have been started. Thus, all interactions during the session can be assumed to be carried out by a single user. When the device is set idle or allowed to go dormant, such as when configured to have a password screen appear, a screen go blank, or a screen-saver or other inactive process be executed, the session can be considered ended.

In further embodiments of the disclosed method, the behavioral input data may be encrypted and/or signed before it is communicated to the behaviometric server. Still further, an additional step may be provided of continuously monitoring usage of said mobile device for patterns that are indicative of fraud being perpetrated on said mobile device. In embodiments, the behavioral data may be gathered, using behavior monitor software installed on the mobile device. In another embodiment, the prior usage may have been by the same user on a different device. Since both devices were at one time in communication with the behaviometric server, the user may be recognized to be using either device. However, in this scenario, access to user credential input may require a greater degree of security or clearance. That is, the step of determining a match may require a greater degree of overlap between the behavioral input data and the prior usage data.

In another embodiment of the disclosed technology, a method is used for confirming that a present user of a mobile device is authorized to use the device. The method may be carried out, not necessarily in the following order, by: a) gathering behavioral data, using a behavior monitor, recording actions taken with respect to components of the mobile device; b) encrypting mobile device identifying information and the behavioral data; c) sending the encrypted identifying information and behavioral data to a decryption server; d) decrypting the identifying information and behavioral data; e) sending the identifying information and behavioral data to a behaviometric server; f) drawing a user profile from a database based on the identifying information; g) determining that the user profile matches the behavioral data; h) generating authentication information upon determining that the user profile matches the behavioral data; i) signing the authentication information using a signature server; and/or j) sending the authentication information to the mobile device.

In further embodiments of this method, an additional step may be provided of sharing the authentication information with a third party application on the mobile device. The authentication information may grant access to a feature of the third party application.

In yet another embodiment of the disclosed technology, a method is used for detecting whether a current user is or is not the same as an intended user of a mobile device. The method is carried out, not necessarily in the following order, by: a) gathering behavioral data relating to the current user's interactions with the mobile device, wherein the interactions comprise use of a GPS, an accelerometer, and a touch screen of the mobile device; b) receiving the behavioral data at a network node; c) retrieving, at the network node, profile data pertaining to the intended user of the mobile device; d) comparing the behavioral data to the profile data to determine if the current user's interactions match the profile data; e) generating a security classification based on the step of comparing; and/or f) sending the security classification to the mobile device, such that the security classification dictates accessibility to certain features on the mobile device.

In further embodiments of this method, the data may be encrypted before the steps of sending and receiving. That is, the data sent may be of a sensitive nature, and thus the data should be secured in the event that it is phished (defined as "activity of defrauding an online account holder of financial information by posing as a legitimate company") or intercepted while being sent. The security classification may be correlative to a degree or an extent to which the behavioral data match the profile data. Thus, the closer the match, the higher the security classification that will be generated, and the higher security clearance that will be received. Still further, the security classification may be signed at the network node. The signature is interpreted and confirmed at the mobile device to enhance security.

In further embodiments of the disclosed method, the step of gathering behavioral data may be carried out using a behavior monitor installed onto the mobile device. Alternatively, the behavior monitor is incorporated into an operating system of the mobile device. A "behavior monitor," for purposes of this specification, is defined as any sequence or steps or algorithm stored on a non-transitory storage medium and carried out by a processor of a mobile device. The behavior monitor may be a software program (defined as, "lines of compiled code which are executable on a processor") installed or written onto the storage of the mobile device. The behavior monitor may run as a background process on the mobile device. A user may or may not be aware of the behavior monitor's presence on the mobile device. Alternatively, the behavior monitor may be stored remotely, at a node or a server that is accessible via the mobile device through a network connection.

It should be understood that the use of "and/or" is defined inclusively such that the term "a and/or b" should be read to include the sets: "a and b," "a or b," "a," "b." Further details are set forth in the detailed description below.

DETAILED DESCRIPTION OF EMBODIMENTS OF THE DISCLOSED TECHNOLOGY

Embodiments of the disclosed technology are directed to methods and/or systems for using behavioral authentication for tying mobile devices to users. The methods and/or systems may employ a behavior monitor, a secure element, a behaviometric server and/or cryptographic servers to authenticate users. The behavior monitor may gather, interpret and/or encrypt behavior information using a secure element. A behaviometric server may be used to compare them to stored profiles of users and generate authentication information based on the comparison.

Embodiments of the disclosed technology will become clearer in view of the following description of the Figures.

Figure 1:
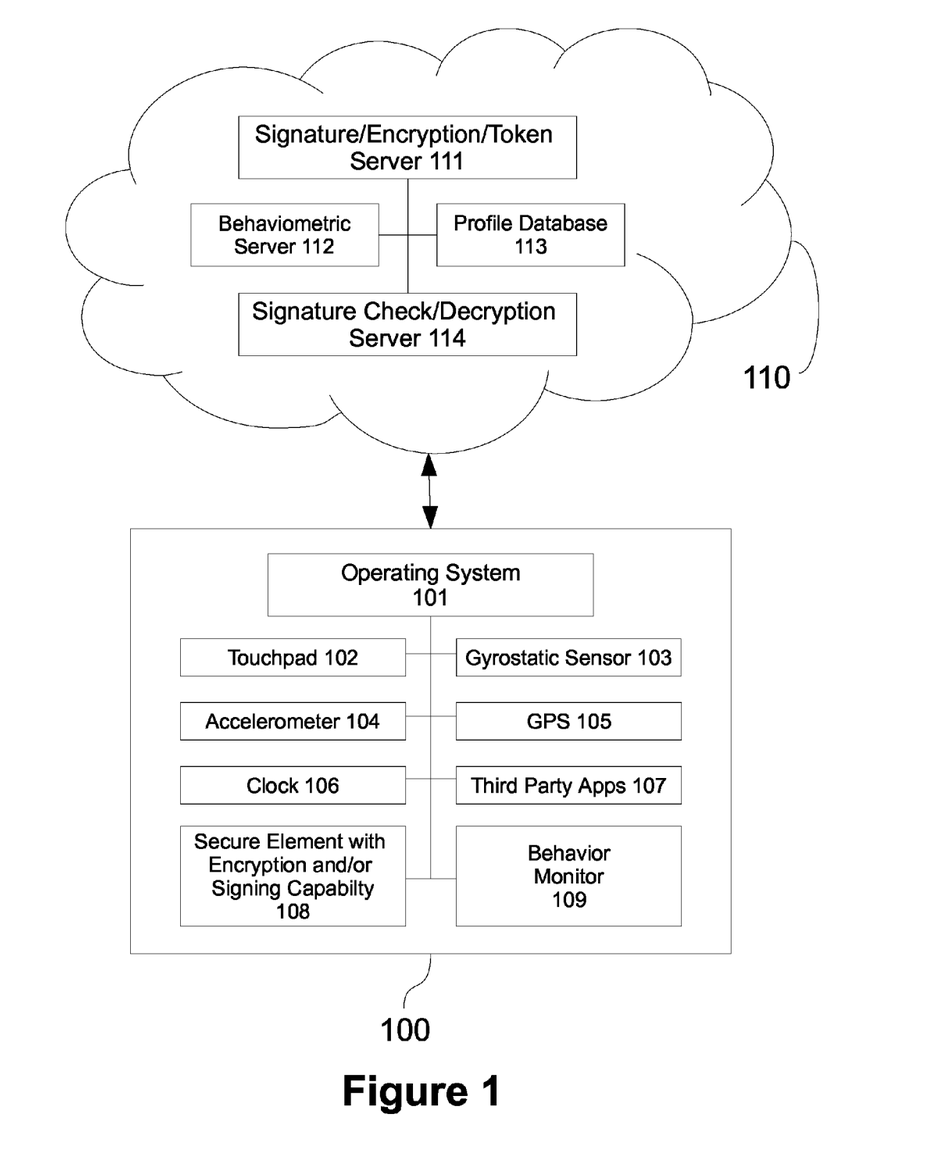
FIG. 1 shows an overview of an exemplary system of an embodiment of the disclosed technology.

FIG. 1 shows an overview of an exemplary system of an embodiment of the disclosed technology. The system is used to tie users to a specific mobile device 100. A mobile device 100 is defined as any portable electronic device with a processor that carries out instructions, and having at least one wireless packet-switched network connection, an input for user interaction, and a visible display with which a user may interact. Examples of mobile devices 100 may be, but are not limited to, mobile phones, tablets, PDAs (personal digital assistant), laptops, netbooks, smartwatches, e-readers, and/or digital cameras. The system ties a user to a specific device 100 by binding a user authentication to a secure element 108 that is included on the mobile device or accessible via the mobile device. Behaviometric data of a user is gathered while the user is using the mobile device 100. The data are encrypted/signed using a secure element, associated with the mobile device, and sent to the behaviometric server. Upon subsequent uses of the mobile device, the behaviometric data are sent to the behaviometric server for authentication, and a resulting command is sent back to the mobile device or to a secured service.

Referring still to FIG. 1, the components of a mobile device 100 are shown. All of the components of the mobile device 100 are tied to the operating system 101, which is defined as coded instructions configured to instruct a hardware device to carry out mathematical operations or electrical interactions with physical components electrically or wirelessly connected to one another, as well as user interaction therewith. Physical components include a touchpad 102, a gyrostatic sensor 103, an accelerometer 104, and/or GPS (global positioning system) 105. Each of these physical components may typically already be found in most mobile devices. When employed by the present technology, these components are used to detect and monitor physical movements carried out with respect to the mobile device 100. Such movements may include, for example, an orientation and/or angle at which a user holds the mobile device during operation. For example, a particular user may typically hold the mobile device at a horizontal, landscape orientation, with the display tilted at a 45 degree angle with respect to the ground. Such behavior, if consistently exhibited, may be stored and associated with a user profile pertaining to the particular user. As such, when similar behavior is recognized, the system will associate a present user of the device with the recognized behavioral pattern, and thus grant security clearance based thereon.

Other components of the mobile device 100, which may be monitored, include a clock 106 and/or third party applications 107. Times during which a particular user carries out particular functions may be indicative and dispositive that the particular user should be granted security clearance. For example, if a particular user opens a news application every morning around 7:30 AM, such behavior may become a stored and recognizable pattern indicative of the particular owner of the mobile device.

Other components may be included on the mobile device 100 for purposes of monitoring, recording, and/or sending behavioral data. One example of such is a behavior monitor 109. The behavior monitor 109 may be incorporated into software that is installed onto the mobile device 100. Alternatively, the behavior monitor 109 may be incorporated into the operating system 101. Examples of operating systems may include iOS, Android, BlackBerry OS and Microsoft operating systems. The behavior monitor 109 uses a network connection of the mobile device 100 to send and receive behavioral data. The behavior monitor 109 may run in the background, and collect all available behaviometric data.

The behavior monitor 109 is able to run continuously, so that the system might provide a constant data feed. The behavior monitor 109 may use the secure element 108 for encryption/decryption, signing and/or signature checking operations. The behavior monitor 109 is operable to use all available network capabilities such as GSM, Bluetooth, NFC, etc., to send information to a signature check/decryption server 114, and is capable of receiving information from a signature/encryption/token server 111. The behaviometric data may be formatted using XML, JSON or other suitable structured data format. User information and optional reference information about the used cryptographic keys may also be formatted using XML, JSON or other suitable structured data format. The behavior monitor 109 may also be in communication with a behaviometric server 112, by which behavioral data may be analyzed and cross-referenced to a profile database 113. The profile database 113 may also be accessed remotely via a server system, and may contain personalized behavioral data for different users.

The behavior monitor 109 is operable to interpret behaviometric input by monitoring system events of the mobile operating system. In order to be independent from user actions like installing software or deleting software, the behaviometric monitor 109 may be realized as a system service or included into the source code of the mobile operating system.

The behaviometric input may be preprocessed locally by the behavior monitor 109, using appropriate filters and templates for particular behaviors. This may be carried out, for example, by decreasing the granularity of the available data sources such as the gyrostatic sensor 103 or the accelerometer 104. User touches or pressure values might be filtered to better distinguish the user behavior. Furthermore statistical data about the behavior of the user may also be gathered while the user is using the mobile device 100.

The input may be filtered by either omitting outlier data from the behavior, or using statistical or weighted methods, to gather better suited data for further processing. The behavioral data that is analyzed may include touch gestures, keyboard actions (dwell, flight time), movements of the device by capturing data from the gyrostatic or accelerometer sensor as well as GPS coordinates.

Still further, a component may be included on the device for confirming or rejecting an identity of a user. The secure element 108 might be a simple SIM (subscriber identity module), UICC (universal integrated circuit card), TPM (trusted platform module), NFC (near field communication) module. or another smart card/device. or one that is capable of storing a secret key or a private/public key pair and is able to perform cryptographic operations with it.

The secure element 108 might be included in the mobile device 100 or be otherwise connected to it, such that it may be accessible via an application installed on the mobile device. This may be carried out using several wire-bound or wireless protocols, including, but not limited to, USB (Universal Serial Bus), Bluetooth, NFC, RFID (radio-frequency identification) or other suitable protocols. A secure element 108 may also be a secured application capable of holding a secret or private/public key pair and able to carry out cryptographic operations therewith. It might also be a combination of an application with a protected storage, or an application using a cryptographic co-processor.

The secure element 108 may contain a symmetric key or an asymmetric key pair, and a server key. The server key might be a symmetric key or the public portion of an asymmetric key which can be delivered as a certificate. Cryptographic keys may be included in the secure element 108 at production time of the secure element. Cryptographic keys may be included via a bootstrap process and may later be updated using secure means. The cryptographic key might also be generated in the secure element and authenticated, using traditional public-key infrastructure (PKI) means like signed public-key cryptography standard #10 (PKCS10) and certificates.

Figure 2:
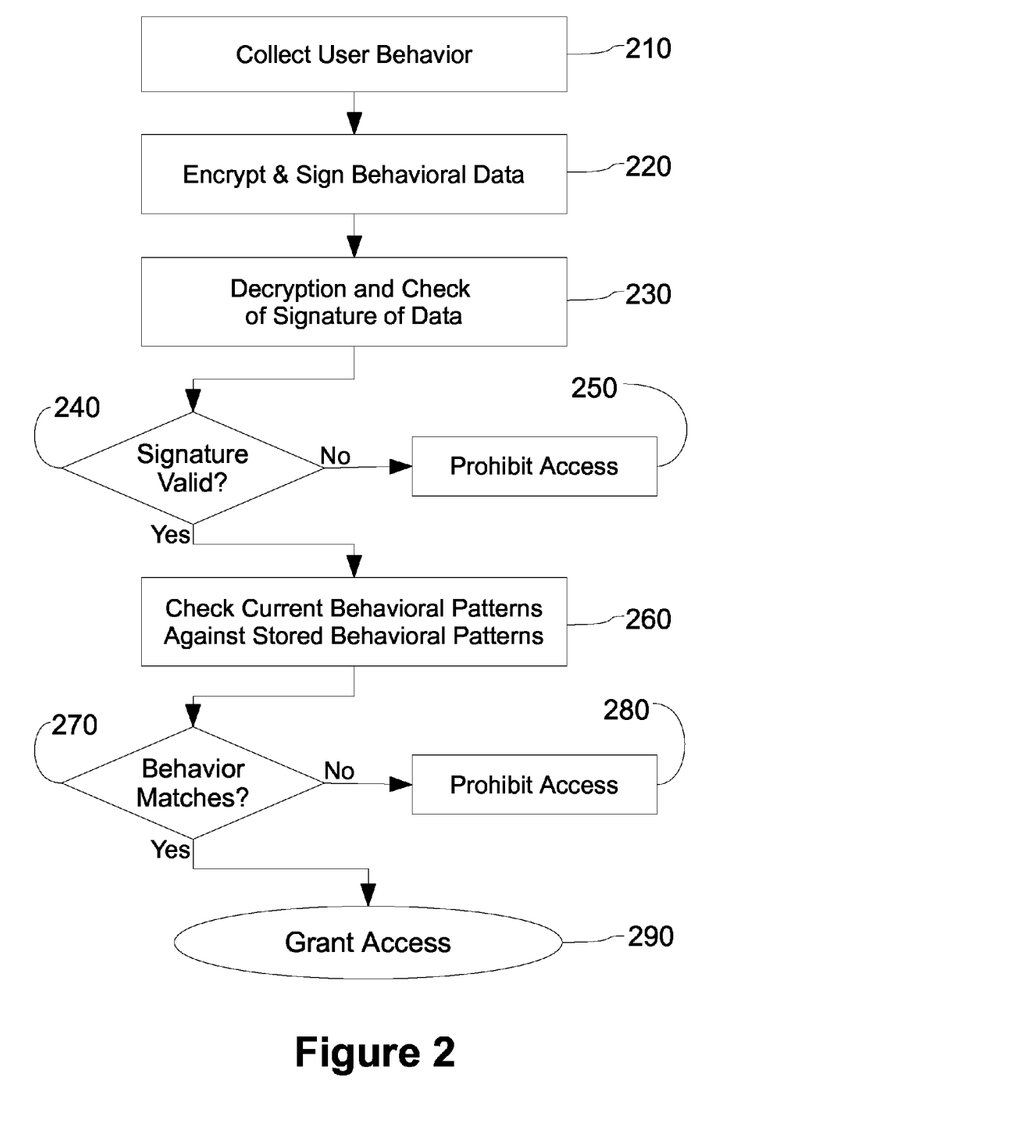
FIG. 2 shows a flow chart of steps taken in a method of an embodiment of the disclosed technology.

FIG. 2 shows a flow chart of steps taken in a method of an embodiment of the disclosed technology. In a first step 210 of the method, the behavior monitor 109 gathers behaviometric data via the mobile device. The behaviometric data may originate from a touch screen, the gyrostatic sensor, the accelerator, the GPS location, or any other operation of the device.

In a second step 220, the behavior monitor uses the secure element to encrypt and optionally sign the gathered data together with other user information or transactional data. A key identifier for the key used may be included with the encrypted data. The encryption may be carried out using well-known formats, such as, SMIME (secure/multipurpose internet mail extensions), PGP (pretty good privacy), XML (extensible markup language) or any other useful encryption format. The behavior monitor may also use the secure element to sign the data. For the encryption of data, a key known to the signature check/decryption server (104) shall be used. Said key may be included in the secure element or delivered from the server to the behavior monitor.

The communication of the key with the server may be carried out, using traditional PKI protocols like CCMP (counter cipher mode protocol), SMIME, PGP, XML DSIG (digital signature) or the like. Alternatively, the key may be imported to the server as an input from the production of the secure element. The needed signature check/decryption server keys or certificates may be incorporated into the secure element either at production time, or in an installation/updating phase of the secure element.

In a third step 230 of the method, the secured data are sent by the behavior monitor to the signature check/decryption server via any available network connection. The server may decrypt the data, using a key which is already known to it, or using the reference information about the used key provided in the data. Its server may also check a signature of the data if a signature was provided with the data.

In step 240, the validity of the signature is checked via the server. The behaviometric data of the user, together with the user information and the optional transaction data, are sent to the behaviometric server, together with the result of a signature check, if available. If the signature is found to be invalid, then access is prohibited to one or more of the functions of the device in step 250.

The method proceeds with step 260, whereby the behaviometric server draws a user profile from the database based on the provided user information. In step 270, if no match is found for the data, access to the device may be prohibited in step 280. Alternatively, the granularity may be adjusted to encompass a broader range of behavioral attributes until a possible match is found. The matching of the behavioral data to profiles of the database may be carried out using traditional statistic algorithms, or using other available algorithms like SVM or Bayes nets or any other suitable algorithms. Thresholds on the similarity of the profile and the provided behavioral information may be used to drive this decision.

If a match is found in step 270, authentication information for the user is generated. The authentication information is signed by signature encryption server and sent to the behavior monitor of the device. The authentication information may be encrypted for further security. If encrypted, a key known to the secure element shall be used. The communication of the key to the server may be carried out using traditional PKI protocols like SMIME, PGP, XML DSIG, etc. The needed secure element keys or certificates may be generated either at production time of the secure element, or in an installation/updating phase of the secure element.

The authentication information is then decrypted using the secure element. Using the authentication information, access is granted to specific features of the mobile device in step 290. The decrypted authentication information may be shared with third party applications on the device which may require security clearance. Those applications requiring security clearance may be considered "protected services" for purposes of this specification. For example, a mobile banking application may require a certain level of security clearance before granting access to certain features thereof. The access granted in step 290 may otherwise be subject to other security measures, such as, for example, the entering of a PIN, the authentication of a fingerprint, or some other biometric security measure.

Once authentication is initially confirmed, a behaviometric authenticated dialogue is started with the protected service using the authentication information provided by the behaviometric monitor. Behavior pertaining to the protected service may continue to be recorded and monitored after access is granted.

If the user is rejected, the rejection information is encrypted by the signature/encryption server and sent to the behaviometric monitor. The behaviometric monitor then decrypts the rejection information using the secure element. The rejection information may then be communicated to the user of the mobile device, informing him/her that a connection to the protected service is not possible due to lack of security clearance.

In another embodiment, which may be combined with any of the previous embodiments, the mobile device may signal the user that he/she was authenticated by the behaviometric server. In still another embodiment, the behaviometric server may send the user data and user information to the signature/encryption/token server together with additional authentication information pertaining to the user, such as a PIN, OTP token information, or other authentication information.

In yet another embodiment, if the user is entering into a transaction, the behavior of the user during the transaction is monitored and recorded, along with any transaction data signed/encrypted by the secure element. The data are then forwarded to the behaviometric server to check if the received behavior matches an expected behavior, as if the user had completed the transaction. The behavior of entering a transaction is being classified differently from browsing the Internet or entering a telephone number or PIN.

In further embodiments, even minimal activity and patterns may be monitored. Such patterns may include keyboard timings, gestures, as well as GUI ("gesture user interface") actions, and the like. As such, it may be possible to prevent so-called "replay attacks," whereby a behavior of a user is monitored and later "replayed." Such a "replay attack" may be difficult to carry out, given the extensive authentication measures required.

In another embodiment, the behaviometric monitor may run in a protected environment using a secure means to monitor and record behaviometric information. It might prompt a user with a specific keyboard on the display to securely enter a PIN and behaviometric data. Furthermore, the behaviometric monitor might use any security means available on the specific mobile device platform to prevent tampering.

In another embodiment, user information provided might include a user name, a device ID, a token, a nonce, an ID of the secure element, an ID contained in the secure element, a PIN, an OTP token, and/or any combination thereof. In another embodiment, the supplied user information might include transaction data or the hash of a transaction.

In still further embodiments, the decision of the behaviometric server may be based on the quality and/or the amount of data stored in a particular profile. As such, a profile with relatively little data may be more easily authenticated. Conversely, the decision of the behaviometric server may be based on the quality and/or the amount of data recorded regarding a present user. Still further, the decision of the behaviometric server may be based on the behaviometric data provided by the user and the requested service. Still further, the decision of the behaviometric server may be based on the behaviometric data provided by the user, and transaction data or the monetary value of the transaction. The authentication information may contain parts of the supplied user information.

Still further, if the behaviometric server decides that the behaviometric data supplied by the user is not fitting to the behaviometric profile drawn from the database, a further authentication request is sent to an operating system. As such, the operating system may generate an additional authentication request to the user. The operating system may go even further to call the user and ask for an additional authentication, such as a PIN number or a personal question known only to the user. The additional authentication information provided by the user may also be compared to a database, and a decision may be made based on the comparison. In a further embodiment, the operating system may override a previous decision of the behaviometric server rejecting authentication. In another embodiment, a call center may place a call to the user requesting authentication information such as a PIN or an answer to a security question.

Encryption of user data may be carried out using a symmetric encryption, an asymmetric encryption algorithm, or a combination thereof. The secured element may sign the user data, using a secure key that is stored in the secure element. For the signature of the user data, an asymmetric operation such as RSA, elliptic curves, and/or any other suitable asymmetric signature algorithm may be used. Alternatively, a symmetric MAC based signature operation or a combination of an asymmetric and a symmetric signature, may be used. Still further, the secured element may be the signature on the authentication information from the signature server, as opposed to locally via the device. The signature/encryption token server may encrypt the authentication information. The cryptographic keys may be secured using certificates in a PKI infrastructure. Alternatively, the cryptographic keys may be secured using MAC based cryptosystems.

Concerning the unlocking of the protected service, the authentication information may also be sent directly to the protected service. Furthermore, in the event of a rejection, the information may also be sent directly to the protected service. Communication with the protected service may be carried out via the mobile device, using a communicated token or nonce. The protected service may be stored on the mobile device, on the secured element, or on the Internet (via URL). The protected service may merely encompass a certain action or feature of a third party application, such as, for example, a transaction authentication request.

Figure 3:
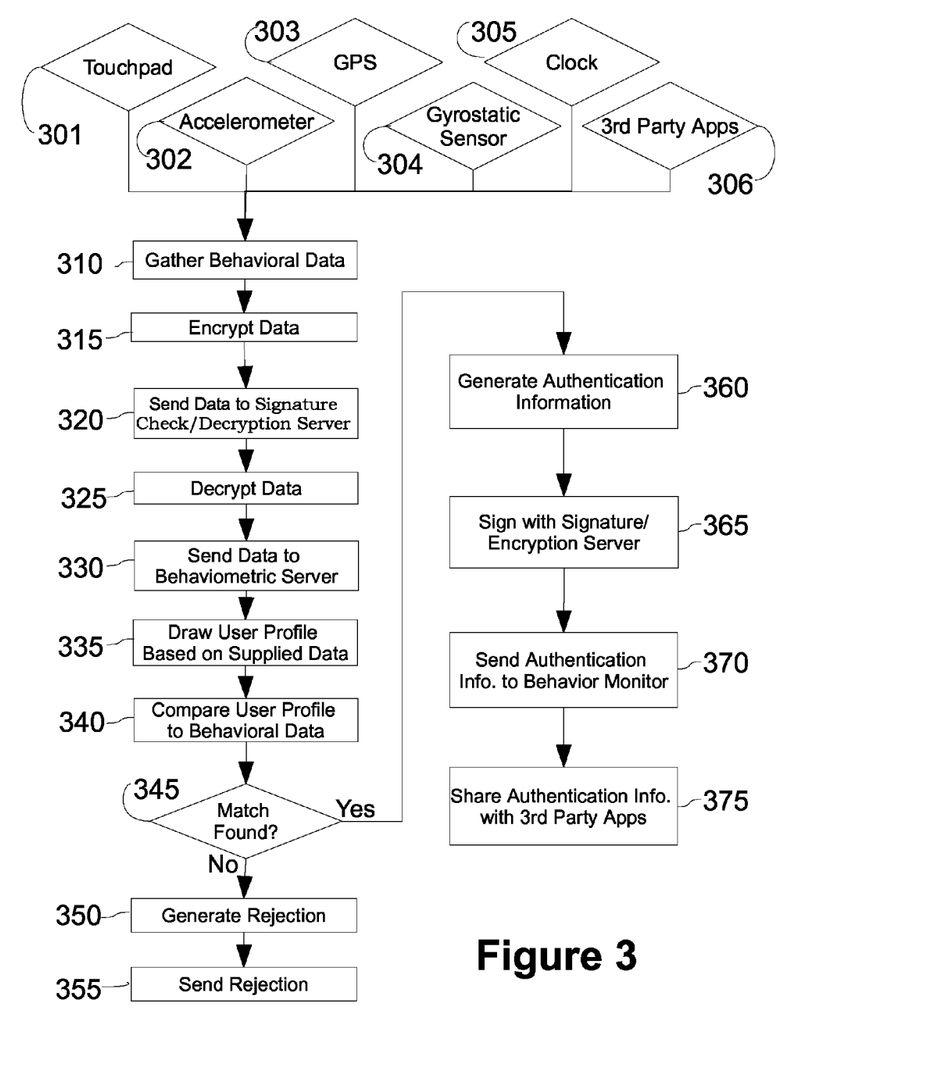
FIG. 3 shows a detailed flow chart of steps taken in another method of an embodiment of the disclosed technology.

FIG. 3 shows a detailed flow chart of steps taken in another method of an embodiment of the disclosed technology which may be used. In the first step 310 of the method, behaviometric data are gathered from multiple on-board components of the mobile device. The data may be gathered from usage of the touchpad 301, the accelerometer 302, the GPS 303, the gyrostatic sensor 304, the clock 305, and/or third party applications 306. The gathered behaviometric data may be grouped, and then encrypted and optionally signed, in step 315. Other data, such as those regarding the mobile device, the owner of the mobile device, and the nature of the permission that is sought to be granted may also be encrypted in step 315.

Next, in step 320 the encrypted data are sent to a signature check/decryption server. The encrypted data may be sent via the mobile device's network connection, which may be via a local area network, a packet-switch data network, or any other type of connection. In step 325, the data are decrypted via the server. Next, in step 330, the data are sent to a behaviometric server. The mobile device data may then be used in step 335 to draw a user profile from a database. The servers and the database may be remotely located. Once the user profile is drawn, it is compared to the behavioral data in step 340. Next, in step 345, a determination is made as to whether the user profile matches the gathered behavioral data.

If no match is found, then the server assumes that the user is not trusted or is not the owner of the mobile device. Thus, in step 350 a rejection is generated, and in step 355 the rejection is sent to the mobile device. The rejection may inform the user why he or she has been denied security clearance. Alternatively, the rejection may restrict access to a certain application, a certain feature of an application, and/or a certain feature of the mobile device.

If, on the other hand, the user profile matches the behavioral data, then authentication information is generated in step 360. The authentication information serves the purpose of communicating to the mobile device that the user is, in fact, an authorized user pursuant to the user's behaviometric information matching that of the drawn user profile. The authentication information is then signed in step 365. The signing of the authentication information adds an extra level of security which indicates to the mobile device that the data being sent are secure and allows the authentication information to be checked by the mobile device or third party applications and services.

Next, in step 370, the authentication information is sent to the mobile device via the behavior monitor. Upon receipt thereof, the authentication information is shared with third party applications. The third party applications may use the authentication information to grant security clearance to the user with regard to certain features and actions. For example, the authentication information may grant a user access to a mobile banking application on the mobile device, the user's behavior having been authenticated. Of course, access is also subject to traditional security measures, such as the entering of a password or PIN number.

The authentication information may alternatively be in the form of a security classification of the current user. If the behavioral data only partially match the profile data, then some level of authentication may be granted. That is, certain features of the mobile device and/or of third party applications may be accessible if those features do not require a high level of security. For example, a user with partial authentication may be permitted to access text messages on a mobile device, but would still be restricted from accessing critical information, such as a mobile banking application. The security classification may be based on a numeric scale, such as, for example, 1 to 10, 1 being lowest level of security clearance and 10 being the highest level of security clearance. The use of security classifications may be appropriate when the gathered behavioral data do not dispositively (defined as exactly or beyond a reasonable doubt) match the user profile data. Such may be the case when an intended user of a mobile device is on vacation or is following a different personal schedule than normal.

Figure 4:
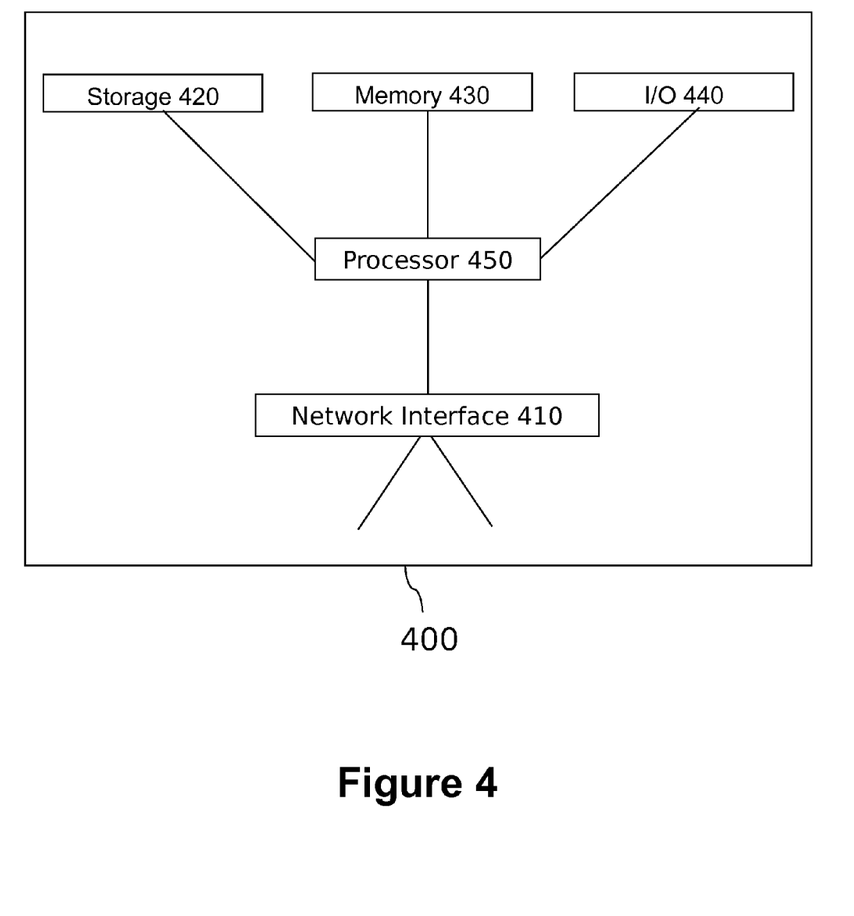
FIG. 4 shows a high-level block diagram of a device of the base that may be used to carry out the disclosed technology.

FIG. 4 shows a high-level block diagram of a mobile device that may be used to carry out the disclosed technology. Mobile device 400 comprises a processor 450 that controls the overall operation of the computer by executing the mobile device's program instructions which define such operation. The mobile device's program instructions may be stored in a storage device 420 (e.g., magnetic disk, database) and loaded into memory 430 when execution of the console's program instructions is desired. Thus, the mobile device's operation will be defined by the mobile device's program instructions stored in memory 430 and/or storage 420, and the console will be controlled by processor 450 executing the console's program instructions.

A mobile device 400 also includes one or a plurality of input network interfaces for communicating with other devices via a network (e.g., packet-switched data network). The mobile device 400 further includes an electrical input interface for receiving power and data from a power source. A mobile device 400 also includes one or more output network interfaces 410 for communicating with other devices. Mobile device 400 also includes input/output 440, representing devices which allow for user interaction with a computer (e.g., touch display, keyboard, etc.). One skilled in the art will recognize that an implementation of an actual mobile device will contain other components as well, and that FIG. 4 is a high level representation of some of the components of such a device for illustrative purposes. It should also be understood by one skilled in the art that the methods, systems and/or devices depicted in FIGS. 1 through 3 may be implemented on a device such as is shown in FIG. 4.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

We claim:

1. A method of authenticating a user of a mobile device through behavior monitoring, comprising:
   in a system setup stage:
      storing behavioral input data from at least one user input component of said mobile device on a non-transitory storage medium housed within said mobile device; and
      uploading a version of at least a portion of said stored behavioral input data via a network connection to a behaviometric server; and
   in an authentication stage:
      triggering a security test based on a received user credential input;
      retrieving said behavioral data from at least one of said behaviometric server and/or said storage medium;
      determining if behavioral input data entered during a current session of use of said mobile device matches said retrieved behavioral data collected during prior usage thereof; and
      generating a response based on said comparison, wherein said response is an authentication or a rejection of privileged access sought by said user by way of said user's credential input,
   wherein said behavioral input data comprises at least one electronic input observation derived from interaction of said user with said at least one user input component and selected from the group consisting of a keystroke pattern, a keystroke style, keystroke dwell, keystroke flight time, user touch and/or pressure values, use of one or more particular applications, speech recognition, timing of use of said mobile device and/or of one or more particular applications, and
   wherein said behavioral input data entered during a current session is collected by a background process.

2. The method of claim 1, wherein all of said behavioral input data is averaged and abbreviated before being sent to said behaviometric server.

3. The method of claim 1, wherein said behaviometric server comprises a processor for carrying out said step of determining if behavioral input data entered during a current session of use of said mobile device matches prior usage thereof.

4. The method of claim 1, wherein a said user credential input comprises an action on said mobile device that requires a higher degree of security due to sensitivity of information being exchanged.

5. The method of claim 4, wherein said user credential input further comprises any electronic exchange of currency.

6. The method of claim 1, wherein movement of said mobile device is excluded from said current session when said movement is before said user touches said display in a manner which causes said display to change.

7. The method of claim 1, further comprising:
   continuously monitoring usage of said mobile device for behavioral usage patterns that are indicative of fraud being perpetrated on said mobile device,
   wherein said behavioral usage patterns are indicative of a new user of said device, and
   wherein said continuously monitoring is carried out as a background process.

8. The method of claim 1, wherein said behavioral input data further comprises an average angle at which said mobile device is oriented when said device is held by said user.

9. The method of claim 1, wherein said retrieved behavioral data collected during said prior usage was collected on another mobile device, different from said mobile device, said current session is carried out on said mobile device, and each of said another mobile device and said mobile device is or was in communication with said behaviometric server.

10. The method of claim 1, wherein, if said user is determined to be using said mobile device for the first time, said step of determining requires a greater overlap between said behavioral input data entered during said current session and said retrieved behavioral data collected during said prior usage in order to grant said privileged access.

11. A method of confirming that a present user of a mobile device is authorized to use said mobile device, the method comprising:
   gathering behavioral data, using a behavior monitor running as a background process, by recording actions taken with respect to components of said mobile device;
   encrypting mobile device-identifying information and said gathered behavioral data;
   sending said encrypted identifying information and behavioral data to a decryption server;
   decrypting said identifying information and behavioral data;
   sending said identifying information and behavioral data to a behaviometric server;
   drawing a user profile from a database based on said identifying information;
   determining that behavioral data associated with said user profile matches said decrypted behavioral data;
   generating authentication information upon determining that said behavioral data associated with said user profile matches said decrypted behavioral data;
   following said generating authentication information, signing said authentication information using a signature server; and
   sending said authentication information to said mobile device,
   wherein said behavioral data comprises at least one electronic input observation derived from interaction of said user with said at least one user input component and selected from the group consisting of a keystroke pattern, a keystroke style, keystroke dwell, keystroke flight time, user touch and/or pressure values, use of one or more particular applications, speech recognition, and timing of use of said mobile device and/or of one or more particular applications.

12. The method of claim 11, further comprising:
   using said authentication information to grant access to a third party application on said mobile device.

13. The method of claim 12, wherein said authentication information grants access to a secure feature of said third party application.

14. A method of detecting whether a current user is or is not the same as an intended user of a mobile device, the method comprising:

gathering behavioral data relating to said current user's interactions with said mobile device, wherein said interactions comprise use of a GPS, an accelerometer, and a touch screen of said mobile device, and said behavioral data is selected from the group consisting of a keystroke pattern, a keystroke style, keystroke dwell, keystroke flight time, user touch and/or pressure values, use of one or more particular applications, speech recognition, and timing of use of said mobile device and/or of one or more particular applications;

receiving said behavioral data at a network node;

retrieving, at said network node, profile data pertaining to said intended user of said mobile device, said profile data having behavioral data associated therewith;

comparing said gathered behavioral data to said behavioral data associated with said profile data to determine if said current user's interactions match said profile data;

generating a security classification based on said step of comparing; and sending said security classification to said mobile device such that said security classification dictates accessibility to certain features on said mobile device, wherein said gathering is carried out using a behavior monitor running as a background process.

15. The method of claim 14, wherein said data are encrypted before said steps of receiving and sending.

16. The method of claim 14, wherein said security classification is correlative to a degree to which said gathered behavioral data match said behavioral data associated with said profile data.

17. The method of claim 14, wherein said security classification is signed at said network node.

18. The method of claim 14, wherein said behavior monitor is installed onto said mobile device.

19. The method of claim 14, wherein said behavior monitor is incorporated into an operating system of said mobile device.

* * * * *